(12) United States Patent
Takahashi (10) Patent No.: US 7,920,127 B2
(45) Date of Patent: Apr. 5, 2011

(54) CAPACITIVE COORDINATE DETECTION DEVICE

(75) Inventor: Hiroaki Takahashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 938 days.

(21) Appl. No.: 11/490,657

(22) Filed: Jul. 21, 2006

(65) Prior Publication Data

US 2007/0024596 A1    Feb. 1, 2007

(30) Foreign Application Priority Data

Jul. 29, 2005    (JP) .................................. 2005-220440

(51) Int. Cl.
*G06F 3/041* (2006.01)

(52) U.S. Cl. ...................................................... 345/173

(58) Field of Classification Search .......... 345/156–184; 178/18.01–18.07
See application file for complete search history.

(56) References Cited

U.S. PATENT DOCUMENTS 6,704,005 B2    3/2004    Kato et al.

FOREIGN PATENT DOCUMENTS

JP    2002-123363    4/2002

*Primary Examiner* — Srilakshmi K Kumar
(74) *Attorney, Agent, or Firm* — Brinks Hofer Gilson & Lione

(57) ABSTRACT

A coordinate detection device mounted on an information terminal apparatus is provided. The coordinate detection device includes a substrate that has a wiring region where leading lines to be connected to detection electrodes are located. The leading lines extend in a direction crossing an extension direction of the detection electrodes in the wiring region. The substrate is deformed such that the wiring region is distant from a surface.

4 Claims, 7 Drawing Sheets

CAPACITIVE COORDINATE DETECTION DEVICE

This application claims the benefit of the Japanese Patent Application No. 2005-220440 filed on Jul. 29, 2005, which is hereby incorporated by reference.

BACKGROUND

1. Field

A coordinate detection device mounted on an information terminal apparatus is provided.

2. Related Art

Figure 8:
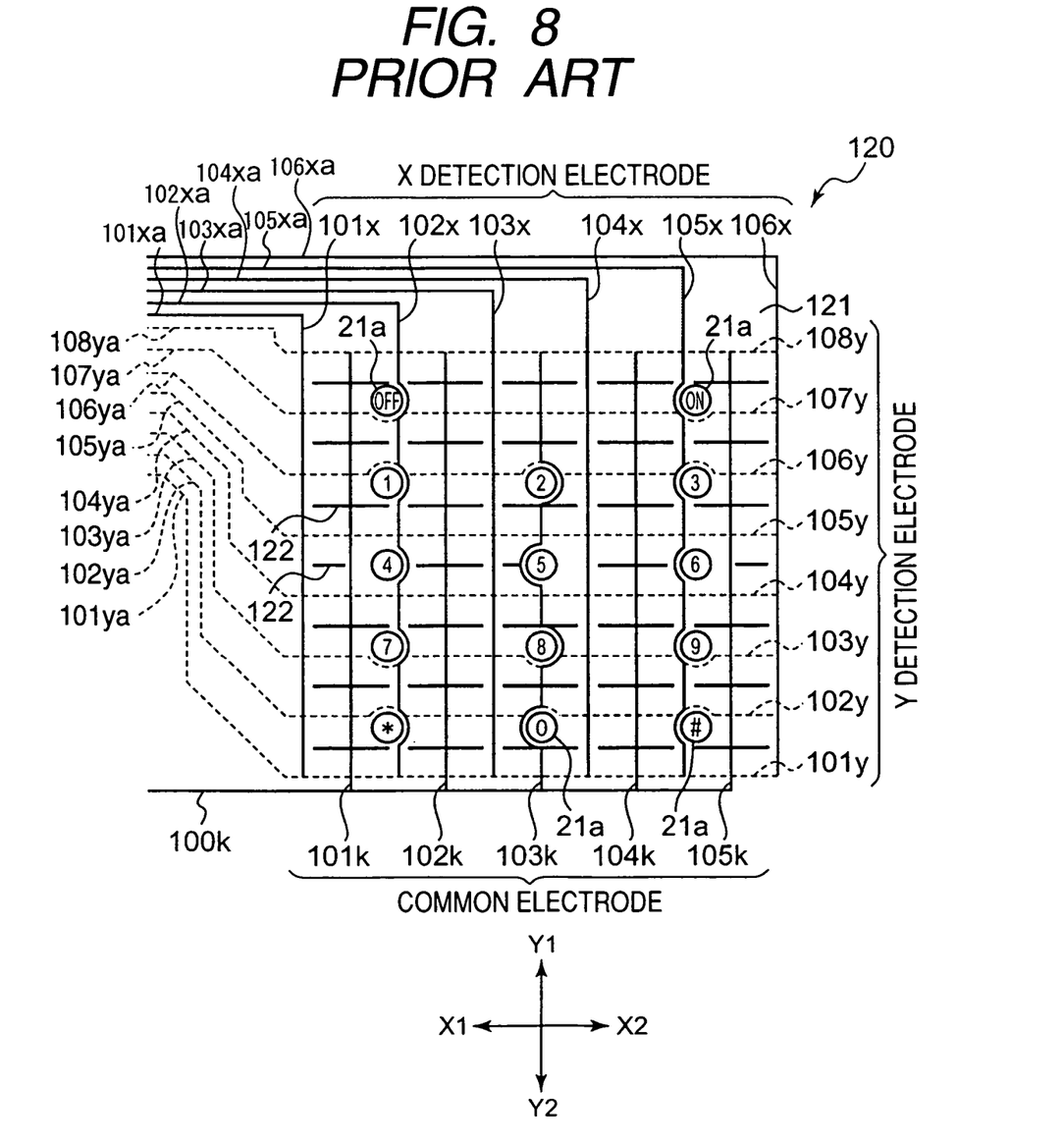
FIG. 8 is a plan view that illustrates a base sheet and electrode patterns that constitute a coordinate detection device according to the related art as viewed from the rear surface.

FIG. 8 is a plan view of a capacitive coordinate detection device according to the related art. The capacitive coordinate detection device shown in FIG. 8 has a base sheet 121 having a film shape formed of a dielectric. As shown in FIG. 8, a plurality of X detection electrodes 101x, 102x, 103x, 104x, 105x, and 106x extend in a Y direction and are disposed at predetermined gaps in an X direction (electrodes that extend in the Y direction and detect an X coordinate at a position where a conductor is brought into contact with or approaches the base sheet). A plurality of common electrodes 101k, 102k, 103k, 104k, and 105k extend in the Y direction and are disposed between the X detection electrodes at predetermined gaps in the X direction and are provided on a rear surface of the base sheet 121 so as not to be brought into contact with each other. The common electrodes 101k, 102k, 103k, 104k, and 105k are connected to one another at the end of the Y2 side, and are led to the outside of the base sheet 121 as a common electrode K.

Further, as indicated by a broken line in FIG. 8, a plurality of Y detection electrodes 101y, 102y, 103y, 104y, 105y, 106y, 107y, and 108y extend in the X direction and are disposed in the Y direction at predetermined gaps (electrodes that extend in the X direction and detect a Y coordinate at a position where the conductor is brought into contact with or approaches the base sheet 121) and are provided on a surface of the base sheet 121. In FIG. 8, the common electrodes 101k, 102k, 103k, 104k, and 105k disposed on the rear surface of the base sheet 121 are indicated by solid lines.

The plurality of X detection electrodes 101x, 102x, 103x, 104x, 105x, and 106x disposed on one surface of the base sheet 121, and the plurality of Y detection electrodes 101y, 102y, 103y, 104y, 105y, 106y, 107y, and 108y disposed on the other surface of the base sheet 121 are disposed to cross at right angles to each other on both surfaces of the base sheet 121.

As shown in FIG. 8, a plurality of common branch electrodes 122 that extend toward both sides of the X direction in a straight line at a predetermined length are formed in the common electrodes 101k, 102k, 103k, 104k, and 105k. The common branch electrodes 122 are disposed to cross the common electrodes 101k, 102k, 103k, 104k, and 105k in the Y direction at predetermined gaps. The front ends of both directions (X1 and X2 directions) basically extend up to positions immediately before crossing the X detection electrodes 101x, 102x, 103x, 104x, 105x, and 106x.

As shown in FIG. 8, the X detection electrodes 101x, 102x, 103x, 104x, 105x, and 106x are correspondingly connected to leading lines 101xa, 102xa, 103xa, 104xa, 105xa, and 106xa at the end of the Y1 side. The X detection electrodes 101x, 102x, 103x, 104x, 105x, and 106x are connected to a control IC (not shown) through the leading lines 101xa, 102xa, 103xa, 104xa, 105xa, and 106xa.

Further, the Y detection electrodes 101y, 102y, 103y, 104y, 105y, 106y, 107y, and 108y are correspondingly connected to leading lines 101ya, 102ya, 103ya, 104ya, 105ya, 106ya, 107ya, and 108ya at the end of the X1 side. The Y detection electrodes 101y, 102y, 103y, 104y, 105y, 106y, 107y, and 108y are connected to the control IC (not shown) through the leading lines 101ya, 102ya, 103ya, 104ya, 105ya, 106ya, 107ya, and 108ya.

In the coordinate detection device 120 shown in FIG. 8, capacitance C is coupled between each of the plurality of common electrodes 101k, 102k, 103k, 104k, and 105k and two electrodes adjacent to each common electrode among the X detection electrodes 101x, 102x, 103x, 104x, 105x, and 106x. If a voltage Vin of a pulse form is applied to each of the X detection electrodes 101x, 102x, 103x, 104x, 105x, and 106x, the voltage Vin is applied to each of the common electrodes 101k, 102k, 103k, 104k, and 105k through capacitance C.

If a conductor comes into contact with or approaches the coordinate detection device 120 in a state where a finger or the like is grounded, charges applied between the common electrode 101k, 102k, 103k, 104k, and 105k and the X detection electrodes 101x, 102x, 103x, 104x, 105x, and 106x are induced to the conductor, thereby reducing capacitance C. Accordingly, a detection voltage Vout depends on a change in capacitance C output from the X detection electrodes 101x, 102x, 103x, 104x, 105x, and 106x. The detection voltage Vout is changed according to a distance between the conductor and the X detection electrodes. It is possible to determine a coordinate position of the conductor in the X direction by sequentially detecting voltage values of the X detection electrodes 101x, 102x, 103x, 104x, 105x, and 106x at a predetermined cycle.

The plurality of common branch electrodes 122 formed in the common electrodes 101k, 102k, 103k, 104k, and 105k, and the Y detection electrodes 101y, 102y, 103y, 104y, 105y, 106y, 107y, and 108y provided between them are opposite to each other. Capacitance C is formed between the common branch electrode 122 and two adjacent Y detection electrodes in the Y direction in the same manner as the above. In the same manner as the X detection electrodes, if a pulse voltage Vin of a predetermined cycle is applied to the common electrode K and a detection voltage Vout output from the Y detection electrodes 101y, 102y, 103y, 104y, 105y, 106y, 107y, and 108y is sequentially detected at a predetermined cycle, it is possible to determine a coordinate position of the conductor in the Y direction.

The coordinate detection device 120 shown in FIG. 8 is mounted on an information terminal apparatus fixed into a case of the information terminal apparatus in a state where the base sheet 121 is in a planar shape.

The configuration in which the capacitive coordinate detection device is mounted on the information terminal apparatus in the planar shape is disclosed in JP-A-2002-123363.

Similarly to FIG. 8, in a capacitive coordinate detection device 120 of the related art, as shown in FIG. 8, a gap between adjacent leading lines 101xa, 102xa, 103xa, 104xa, 105xa, and 106xa is set to be smaller than a gap between the X detection electrodes 101x, 102x, 103x, 104x, 105x, and 106x. The leading lines 101xa, 102xa, 103xa, 104xa, 105xa, and 106xa extend to be close to an operation region that has the X detection electrodes 101x, 102x, 103x, 104x, 105x, and 106x in a direction that crosses the X detection electrodes.

If a conductor such as a finger or the like moves up to the end of the Y1 direction in the operation region, the conductor approaches the leading lines 101xa, 102xa, 103xa, 104xa, 105xa, and 106xa, and then charges of the leading lines are induced to the conductor. An error may occur in position detection in an X coordinate direction.

The leading lines 101*ya*, 102*ya*, 103*ya*, 104*ya*, 105*ya*, 106*ya*, 107*ya*, and 108*ya* obliquely extend from the end of the X1 side of the Y detection electrodes 101*y*, 102*y*, 103*y*, 104*y*, 105*y*, 106*y*, 107*y*, and 108*y*.

If the conductor moves up to the end of the X1 direction in the operation region, since the conductor approaches the obliquely extending leading lines, an error may occur in position detection in a Y coordinate direction.

When the leading lines 101*xa*, 102*xa*, 103*xa*, 104*xa*, 105*xa*, and 106*xa* are provided to be spaced apart from the operation region or when the leading lines 101*ya*, 102*ya*, 103*ya*, 104*ya*, 105*ya*, 106*ya*, 107*ya*, and 108*ya* are provided to be spaced apart from the operation region, the erroneous detection can be reduced or prevented. The area of the base sheet 121 needs to be made large, and thus the size of the coordinate detection device 120 increases. Accordingly, the coordinate detection device cannot be properly mounted on a small information terminal apparatus.

SUMMARY

A coordinate detection device includes a substrate that is formed of an insulating material, and has a surface of an operation side, on which a conductor comes into contact with or approaches. A rear surface is also included that is opposite to the surface. A plurality of detection electrodes are located on the surface or the rear surface and extend in parallel in one direction. Common electrodes are located on the surface or the rear surface and are disposed at gaps from the detection electrodes.

Capacitance between the detection electrodes and the common electrodes is changed when the conductor comes into contact with or approaches the surface. The substrate has a wiring region where leading lines connected to the detection electrodes are located. The leading lines extend in a direction that crosses the extension direction of the detection electrodes in the wiring region. The substrate is deformed such that the leading lines are space away from the conductor coming into contact with the surface.

The detection electrodes may have X detection electrodes that are provided on one side of the surface and the rear surface of the substrate. Y detection electrodes are provided on the other surface and extend to cross the X detection electrodes. The substrate may have a wiring region where the leading lines to be connected to the X detection electrodes are located, and a wiring region where the leading lines to be connected to the Y detection electrodes are located. The substrate may be deformed such that at least one leading lines are distant from the conductor.

The substrate may be a flexible substrate, and the substrate may have a planar operation region where the detection electrodes and the common electrodes are located, and the wiring region. The flexible substrate may be bent through a bending line which is set at a boundary portion between the operation region and the wiring region.

In this case, a bending angle of the wiring region with respect to the operation region may be 90 degrees.

DESCRIPTION

Hereinafter, the preferred embodiments will be described with reference to the drawings.

Figure 1:
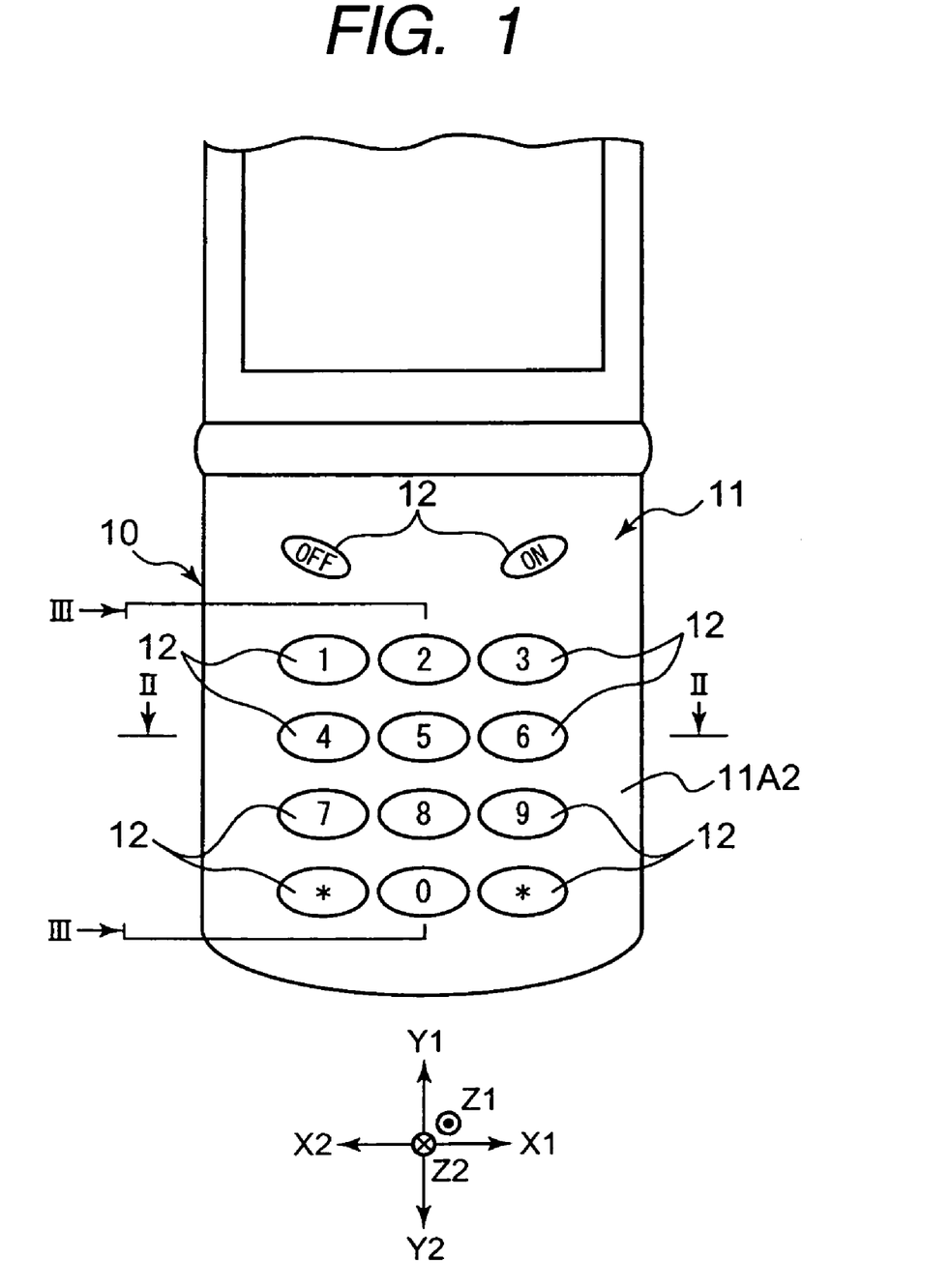
FIG. 1 is a plan view that illustrates a cellular phone as an information terminal apparatus on which a coordinate detection device is mounted.
Figure 2:
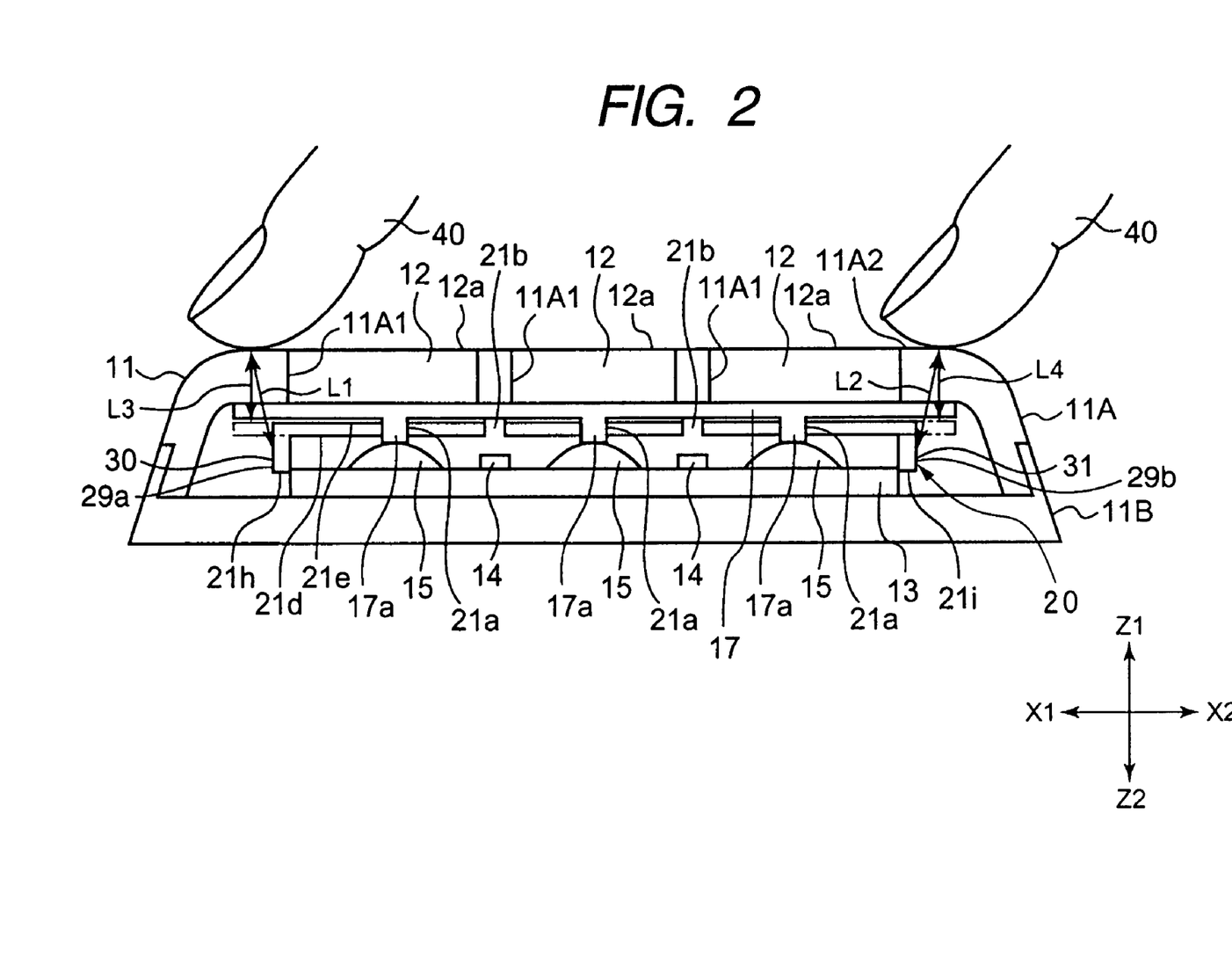
FIG. 2 is a cross-sectional view taken along the line II-II of FIG. 1.

FIG. 1 shows an operation unit 11 of a cellular phone 10 generally as an information terminal apparatus. As shown in FIG. 1, a plurality of operation keys (operation members) 12 having typical key arrangement are arranged in the operation unit 11. As shown in FIG. 2, the operation unit 11 has an upper case 11A and a lower case 11B, which are integrally combined. A plurality of aperture holes 11A1 are formed in the upper case 11A. Key tops 12*a* that are surfaces of the operation keys 12 are exposed from the aperture holes 11A1 toward the outside. Characters, symbols, figures or the like are printed in the key tops 12*a*.

In the cellular phone 10, a top surface 11A2 of the upper case 11A, and the key tops 12*a* that are surfaces of the operation keys 12 constitute an operation surface on which a conductor 40 such as a finger or the like comes into contact with or approaches.

The operation keys 12 are formed of a transparent or translucent synthetic resin. For example, the operation keys 12 are formed as a keymat integrally connected through a hoop portion (not shown). The operation keys 12 are connected to the keymat that serve as a main body side so as to be resiliently deformed in a Z1-Z2 direction through the hoop portion.

A stem mat 17 formed of a transparent or translucent synthetic resin is formed below each of the operation keys 12 (a surface of the Z2 side). A plurality of stems (compression convex portions) 17*a* having columnar shapes integrally project in the stem mat 17 (a surface of the Z2 side), and extend in a direction toward the inside of the device (the Z2 direction).

The operation keys 12 are formed at positions opposite to the stems 17*a* in a vertical direction (the Z1-Z2 direction).

A circuit board 13 is fixed to the lower case 11B. A plurality of electronic components 15 and light sources 14 are provided on the circuit board 13. A front end of each of the stems 17*a* opposite to the operation keys 12 in the vertical direction is disposed opposite to each of the electronic components 15.

Each of the electronic components 15 has a metallic reversion plate having a dome shape and a contact electrode. A base end of the reversion plate is fixed to a ring-shaped electrode provided in the circuit board 13. The inner surface of the reversion plate is opposite to the contact electrode. As the inner surface of the reversion plate is brought into contact with the contact electrode due to the reversion of the reversion plate, the reversion plate serves as a switch that makes the contact electrode and the ring-shaped electrode electrically connected to each other.

The light sources 14 can have LEDs or the like, and are provided around the electronic components 15. When the operation key 12 is pressed, the reversion plate of the electronic component 15 can be reversed by the stem 17a. It is possible to give a pleasant click feeling to an operator.

As shown in FIG. 2, a coordinate detection device 20 is provided within the operation unit 11. The coordinate detection device 20 is fixed onto the bottom surface of the stem mat 17 by means of joining means (not shown) such as an adhesive or an adhesive tape.

Figure 3:
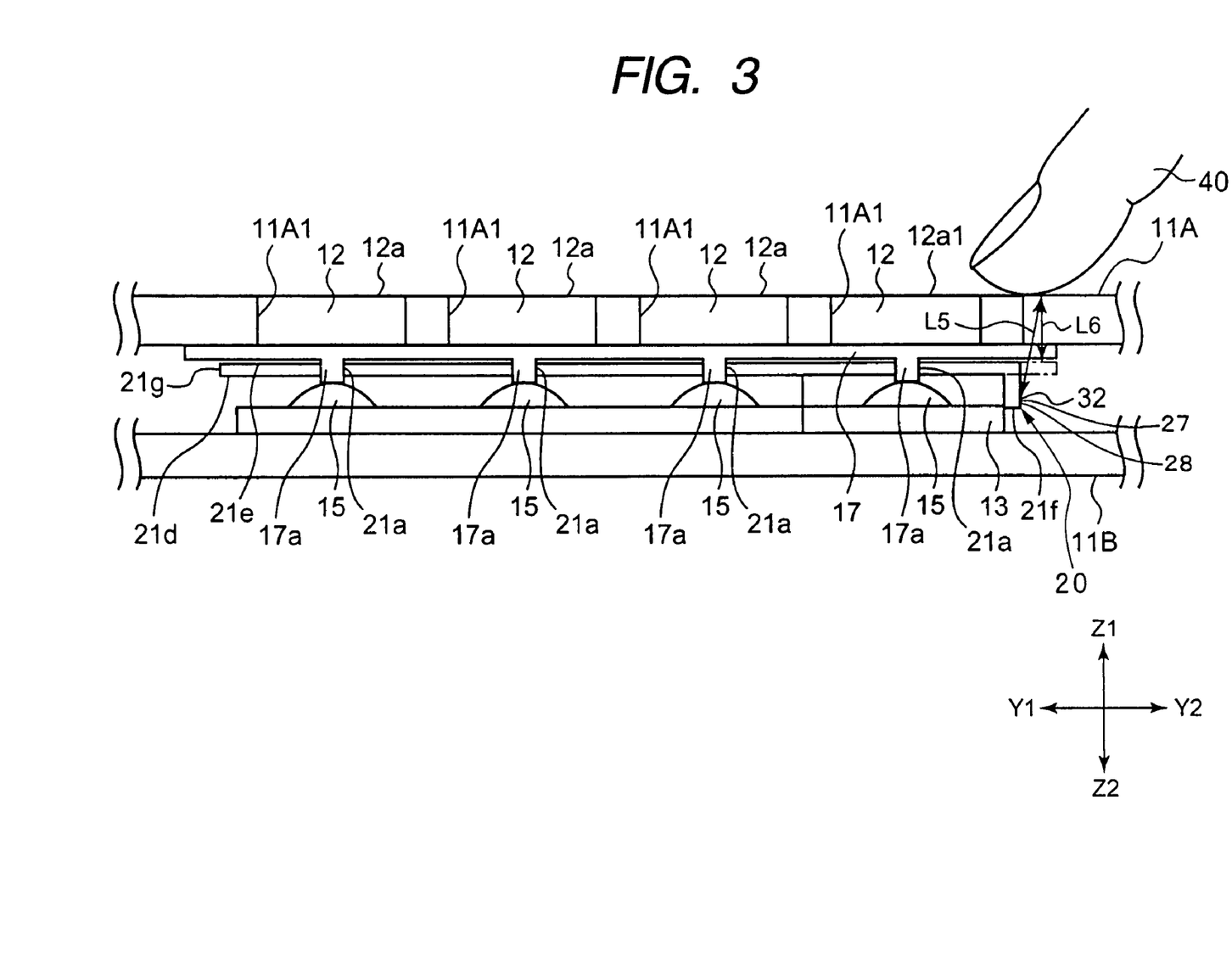
FIG. 3 is a cross-sectional view taken along the line III-III of FIG. 1.
Figure 4:
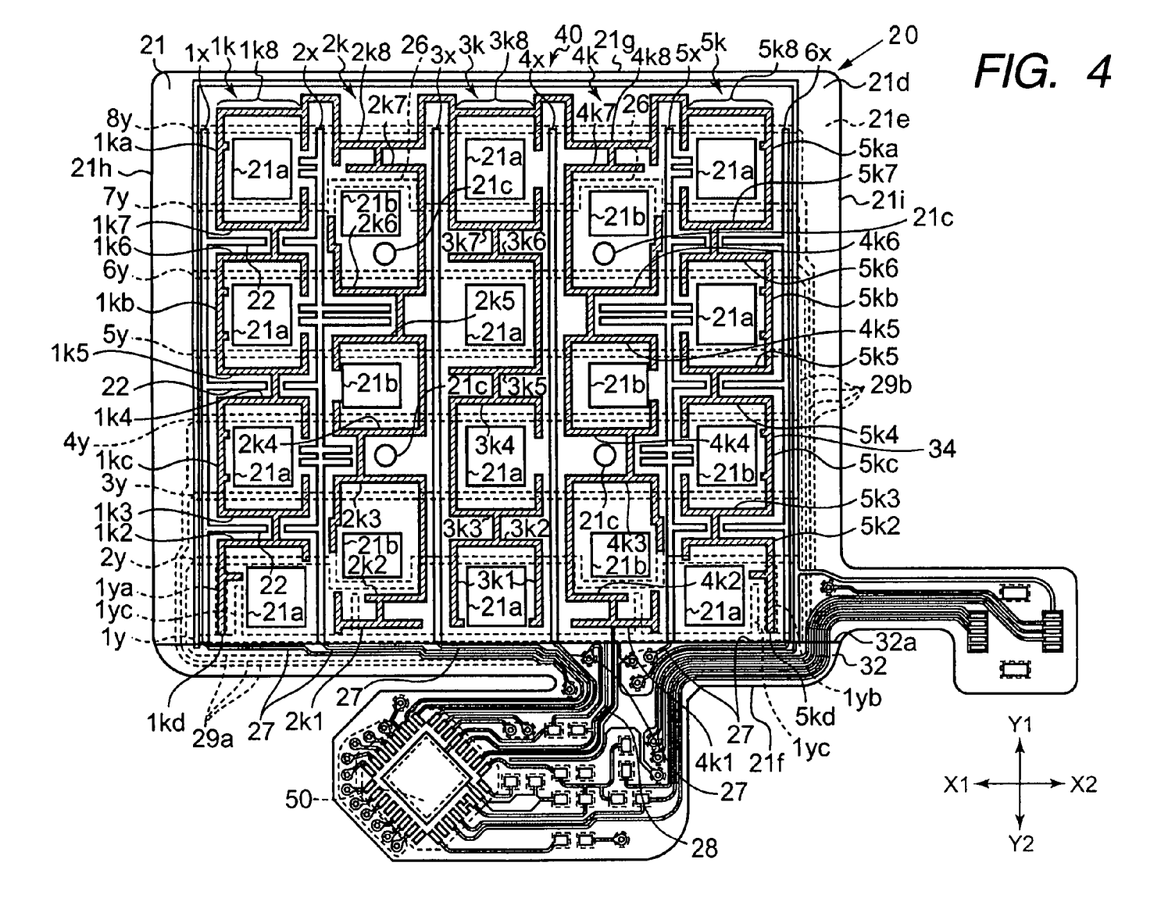
FIG. 4 is a plan view that illustrates a base sheet and electrode patterns that constitute a coordinate detection device from a rear surface.

FIG. 4 is a plan view a base sheet and electrode patterns constituting the coordinate detection device 20 as viewed from a rear surface 21*d*. The coordinate detection device 20 is mounted on the cellular phone 10 such that a surface 21*e* opposite to the rear surface 21*d* shown in FIG. 4 is turned in an upward direction shown in FIGS. 2 and 3 (the Z1 direction), and the rear surface 21*d* opposite to the surface 21*e* is turned in a downward direction shown in FIGS. 2 and 3 (the Z2 direction).

As shown in FIGS. 2 and 3, the surface 21*e* is opposite to an operation surface having the surface 11A2 and the key tops 12*a* which are surfaces of the operation keys 12. The surface 21*e* becomes a surface of an operation side on which the conductor 40 is brought into contact with or approaches. Alternately, the coordinate detection device 20 may be mounted on the cellular phone 10 such that the rear surface 21*d* is located in an operation region. The rear surface 21*d* becomes the surface of the operation side on which the conductor 40 is brought into contact with or approaches.

As shown in FIG. 4, the coordinate detection device 20 has a base sheet 21 has superior flexibility and a film shape. The base sheet 21, which constitutes a substrate in the invention, is formed of an insulating material. As shown in FIGS. 2 and 4, insertion holes 21*a* through which the stems 17*a* pass, or passage holes 21*b* serving as a passage that guides light emitted from the light sources 14 to the rear surface of the operation keys 12 through the stem mat 17 are formed in the base sheet 21.

Mounting holes 21*c* that fix the base sheet 21 are formed. In FIG. 4, squares of a bold line indicate the insertion holes 21*a*, and rectangles of a bold line indicate the passage holes 21*b*. Circular holes indicate the mounting holes 21*c*.

Since light emitted from the light sources 14 can pass through the passage holes 21*b* as a passage, light can brightly shine the rear surfaces of the operation keys (operation members) 12 through the stem mat 17 formed of transparent resin or translucent resin. If the light sources 14 for illumination are disposed opposite to the passage holes 21*b* formed in the base sheet 21, the characters, symbols, figures or the like that are printed in the key tops 12*a* can be clearly seen even in the dark.

The passage holes through which light from the light sources 14 passes may be formed in the stem mat 17. In this case, the stem mat 17 may not be transparent or translucent. Further, the light sources 14 may not be formed. In this case, the stem mat 17 may not be transparent or translucent.

As shown in FIG. 4, a plurality of X detection electrodes 1*x*, 2*x*, 3*x*, 4*x*, 5*x*, and 6*x* that extend in a Y direction and are disposed in an X direction at predetermined gaps (electrodes that extend in the Y direction and detect an X coordinate at a position where the conductor 40 is brought into contact with or approaches) are provided to be located on the rear surface 21*d* of the base sheet 21. Further, a plurality of common electrodes 1*k* 2*k*, 3*k*, 4*k*, and 5*k* (common electrode K) that extend in the Y direction as a whole while keeping out of the insertion holes 21*a* or the passage holes 21*b* formed in the base sheet 21 are provided to be located at predetermined gaps in the X direction at positions where they are not brought into contact with the X detection electrodes 1*x*, 2*x*, 3*x*, 4*x*, 5*x*, and 6*x*.

In FIG. 4, solid lines that have no hatching indicate the X detection electrodes 1*x*, 2*x*, 3*x*, 4*x*, 5*x*, and 6*x* formed on the rear surface 21*d* of the base sheet 21, and solid lines having hatching indicate the common electrodes 1*k*, 2*k*, 3*k*, 4*k*, and 5*k* formed on the rear surface 21*d*.

Figure 5:
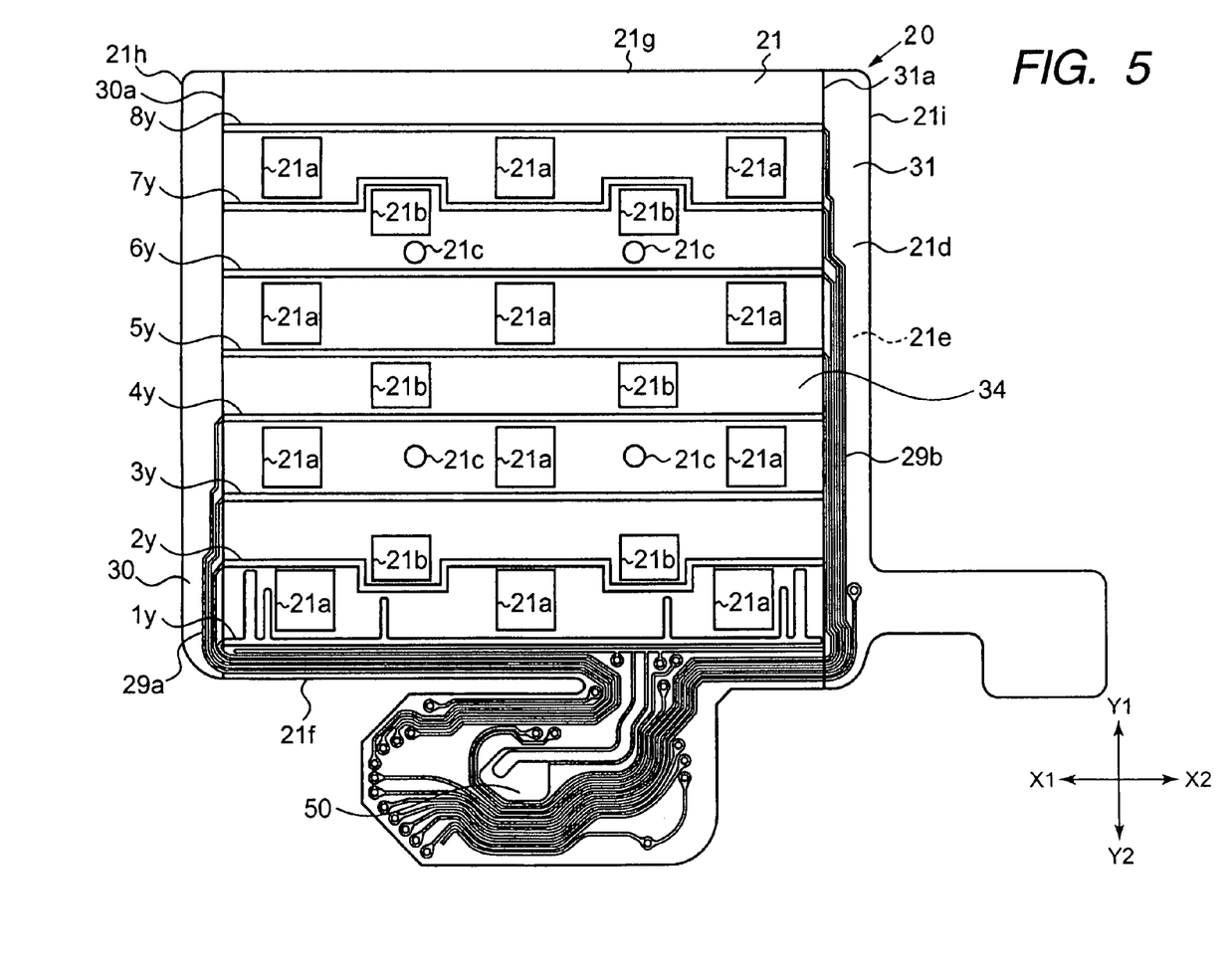
FIG. 5 is a perspective and plan view that illustrates an electrode pattern of Y detection electrodes formed on a surface of a base sheet of FIG. 4.

As indicated by broken lines in FIG. 4 and solid lines in FIG. 5, a plurality of Y detection electrodes 1*y*, 2*y*, 3*y*, 4*y*, 5*y*, 6*y*, 7*y*, and 8*y* that extend in the X direction and are disposed at predetermined gaps in the Y direction (electrodes that extend in the X direction and detect a Y coordinate at a position where the conductor 40 is brought into contact with or approaches) are provided on the surface 21*e* of the base sheet 21 to extend to cross the X detection electrodes 1*x*, 2*x*, 3*x*, 4*x*, 5*x*, and 6*x*.

The common electrode 1*k* has common counter electrodes 1*k*2, 1*k*3, 1*k*4, 1*k*5, 1*k*6, 1*k*7, and 1*k*8 that extend in the Y direction and are partially opposite to the Y detection electrodes 1*y*, 2*y*, 3*y*, 4*y*, 5*y*, 6*y*, 7*y*, and 8*y*, respectively, in parallel. The common electrode 1*k* extends in the Y direction at the left end. In the same manner, the common electrode 2*k* has common counter electrodes 2*k*1, 2*k*2, 2*k*3, 2*k*4, 2*k*5, 2*k*6, 2*k*7, and 2*k*8 that are partially opposite to the Y detection electrodes 1*y* to 8*y*, respectively, in parallel. In the same manner, the common electrode 3*k* has common counter electrodes 3*k*2, 3*k*3, 3*k*4, 3*k*5, 3*k*6, 3*k*7, and 3*k*8 that are partially opposite to the Y detection electrodes 1*y* to 8*y*, respectively, in parallel.

The common electrode 4*k* has common counter electrodes 4*k*1, 4*k*2, 4*k*3, 4*k*4, 4*k*5, 4*k*6, 4*k*7, and 4*k*8 that are partially opposite to the Y detection electrodes 1*y* to 8*y*, respectively, in parallel. In the same manner, the common electrode 5*k* has common counter electrodes 5*k*2, 5*k*3, 5*k*4, 5*k*5, 5*k*6, 5*k*7, and 5*k*8 that are partially opposite to the Y detection electrodes 1*y* to 8*y*, respectively, in parallel.

The common electrodes 1*k*, 2*k*, 3*k*, 4*k*, and 5*k* are connected to the common counter electrodes 1*k*8, 2*k*8, 3*k*8, 4*k*8, and 5*k*8 on the Y2 side. Leading lines 28 for ground extend from the end of the Y2 side (the common counter electrode 4*k*1) of the common electrode 4*k* of the common electrode K (the common electrodes 1*k*, 2*k*, 3*k*, 4*k*, and 5*k*), and are connected to a control IC (control unit) 50, which will be described below.

In the common electrode 1*k*, the common counter electrode 1*k*8 and the common counter electrode 1*k*7 that are adjacent to each other in the Y direction are connected to a common counter electrode 1*ka* extending in the Y direction. The common counter electrode 1*k*6 and the common counter electrode 1*k*5 are connected to a common counter electrode 1*kb*. The common counter electrode 1*k*4 and the common counter electrode 1*k*3 are connected to a common counter electrode 1*kc*. The common counter electrode 1*k*5 and the common counter electrode 1*k*4 are connected to a common counter electrode 1*kc*. A common counter electrode 1*kd* extending in the Y direction is provided from the common counter electrode 1*k*2. The common counter electrodes 1*ka*, 1*kb*, 1*kc*, and 1*kd* extending in the Y direction and the X detection electrode 1*x* are partially opposite to each other, and a capacitance is formed between them.

A pair of the common counter electrode 1*k*7 and the common counter electrode 1*k*6, a pair of the common counter electrode 1*k*5 and the common counter electrode 1*k*4, and a pair of the common counter electrode 1*k*3 and the common counter electrode 1*k*2 are disposed opposite to each other in parallel, and form the same parallel electrodes.

A plurality of common branch electrodes 22 that extend in the X direction are formed in the X detection electrode 1x. The common branch electrodes 22 are disposed opposite to each other between the parallel electrodes formed by the pair of the common counter electrodes, thereby forming a first capacitance adjustment unit.

A plurality of the common branch electrodes 22 extending in the X1 and X2 directions are formed in the X detection electrode 2x. The common branch electrodes 22 are disposed opposite to each other between the parallel electrodes formed by the pair of the common counter electrodes in the common electrode 1k or the common electrode 2k, thereby forming a second capacitance adjustment unit.

In this case, if the common electrode 1k is set as a reference common electrode BK, the X detection electrode 1x corresponds to a first detection electrode XR, and the X detection electrode 2x corresponds to a second detection electrode XL. Variations in comprehensive composite capacitance C between the reference common electrode (the common electrode 1k) and the first detection electrode (the X detection electrode 1x) and between the reference common electrode (the common electrode 1k) and the second detection electrode (the X detection electrode 2x) can be kept low by means of the first capacitance adjustment unit and the second capacitance adjustment unit, that is, composite capacitance C formed between the electrodes can be kept constant.

This relationship can be applied between other common electrodes and other X detection electrodes in the same manner.

In the Y detection electrode 8y that extends in the X direction linearly, capacitance is formed between the common counter electrodes 1k8, 3k8, and 5k8 located on the Y1 side of the Y detection electrode 8y. Capacitance is formed between the common counter electrodes 2k8 and 4k8 located on the Y2 side of the Y detection electrode 8y. Five common counter electrodes 1k8, 2k8, 3k8, 4k8, and 5k8 are alternately opposite to each other at locations on both sides of the Y detection electrode 8y, and predetermined capacitance is formed between them.

In the same manner, in the Y detection electrode 7y having detours 26 and 26, five common counter electrodes 1k7, 2k7, 3k7, 4k7, and 5k7 are alternatively opposite to each other at locations on both sides of the Y detection electrode 7y, and predetermined capacitance is formed between them. In the same manner, predetermined capacitance is also formed through five common counter electrodes in the Y detection electrodes 6y, 5y, 4y, 3y, and 2y, excluding the Y detection electrode 1y.

As shown in FIG. 4, the control IC 50 that applies a voltage of a predetermined sampling cycle between each of the X detection electrodes and the common electrode K and between each of the Y detection electrodes and the common electrode K and detects displacement of capacitance is provided in the base sheet 21. Leading lines 27 extend from the ends of the Y2 side up to connection terminals of the control IC 50 are formed in the X detection electrodes 1x, 2x, 3x, 4x, 5x and 6x formed on the rear surface 21d of the base sheet 21, respectively. The plurality of leading lines 27 extend to cross the X detection electrodes 1x, 2x, 3x, 4x, 5x, and 6x.

As shown in FIGS. 4 and 5, on the surface 21e of the base sheet 21, the Y detection electrodes 1y, 2y, 3y, and 4y are connected to the control IC 50 through leading lines 29a extending from the ends of the X2 side, and the Y detection electrodes 5y, 6y, 7y, and 8y are connected to the control IC 50 through leading lines 29b that extend from the ends of the X1 side. The leading lines 29a and the leading lines 29b extend to cross the Y detection electrodes 5y, 6y, 7y, and 8y.

FIG. 5 is a plan view that shows an electrode pattern of the Y detection electrodes formed on the surface 21e of the base sheet 21 as viewed from the rear surface 21d. Although the Y detection electrodes 1y, 2y, 3y, 4y, 5y, 6y, 7y, and 8y formed on the surface 21e and the leading lines 29a and 29b has to be indicated by broken lines, in FIG. 5, for a better understanding of the structure, the Y detection electrodes 1y, 2y, 3y, 4y, 5y, 6y, 7y, and 8y and the leading lines 29a and 29b are indicated by solid lines.

In the coordinate detection device 20, if one of the plurality of common electrodes 1k, 2k, 3k, 4k, and 5k, for example, the common electrode 3k, is set as the reference common electrode, the X detection electrode located on one side (for example, the right side) adjacent to the reference common electrode 3k becomes 4x, and the X detection electrode located on the other side adjacent to the reference common electrode 3k (for example, the left side) becomes 3x.

If a voltage Vin of a pulse form is applied to the X detection electrodes 1x, 2x, 3x, 4x, 5x, and 6x through an oscillation unit (not shown), predetermined capacitance C1 is formed between the reference common electrode 3k and the X detection electrode 3x, and predetermined capacitance C2 is formed between the reference common electrode 3k and the X detection electrode 4x.

If a distance d between the reference common electrode 3k and the X detection electrode 3x and an opposite length between the electrodes are the same as a distance d between the reference common electrode 3k and the X detection electrode 4x and an opposite length between the electrodes, respectively, the relationship C1=C2 is established and a balance is adjusted between the electrodes.

In this embodiment, if the conductor 40 is brought into contact with or approaches on the surface 21e having the reference common electrode 3k formed thereon in a state where a finger or the like is grounded, charges applied between the reference common electrode 3k and the X detection electrodes 3x and 4x are induced to the conductor, thereby reducing capacitance C1 and C2. A detection voltage Vout that depends on the variations in capacitance C1 and C2 is output from the X detection electrodes 3x and 4x. The detection voltage Vout is output as a low voltage value as a distance between the conductor 40 and the X detection electrodes is close. Voltage values output from the X detection electrodes 3x and 4x are smallest, and voltage values output from other X detection electrodes 1x, 2x, and 5x are large. It is possible to determine a coordinate position of the conductor 40 in the X direction within the surface 21e (a position of an X coordinate of the conductor 40 within the rear surface 21d when the coordinate detection device 20 is mounted on the cellular phone 10 such that the rear surface 21d is located in the operation region) by sequentially detecting the voltage values of the X detection electrodes 1x, 2x, 3x, 4x, 5x, and 6x at a predetermined cycle.

Common counter electrodes 1k2 to 1k8, 2k1 to 2k8, 3k1 to 3k8, 4k1 to 4k8, and 5k1 to 5k8 are formed in the common electrodes 1k, 2k, 3k, 4k, and 5k, respectively, so as to be partially opposite to the Y detection electrodes 1y, 2y, 3y, 4y, 5y, 6y, 7y, and 8y.

If one of the common counter electrodes 1k2 to 1k8, 2k1 to 2k8, 3k1 to 3k8, 4k1 to 4k8, and 5k1 to 5k8 is set to as a reference common electrode, capacitance C1 and C2 are also formed between the common electrode and adjacent Y detection electrodes in the Y direction. In the same manner as the X detection electrodes, if a pulse voltage Vin of a predetermined cycle is applied to the Y detection electrodes 1y, 2y, 3y, 4y, 5y, 6y, 7y, and 8y and a detection voltage Vout output from the Y detection electrodes 1y, 2y, 3y, 4y, 5y, 6y, 7y, and 8y is sequentially detected at a predetermined cycle, it is possible to determine a coordinate position of the conductor 40 in the Y direction (a position of the X coordinate of the conductor 40 within the rear surface 21d when the coordinate detection device 20 is mounted on the cellular phone 10 such that the rear surface 21d is located in the operation region).

The coordinate detection device 20 is configured to acquire the coordinate position of the X direction and the coordinate position of the Y direction, such that coordinate information of the conductor 40 can be input to the cellular phone 10.

In the coordinate detection device 20, as shown in FIG. 5, the leading lines 29a are substantially bent at right angles with respect to the Y detection electrodes 1y, 2y, 3y, and 4y and extend in parallel with a side edge 21h of the X1 side of the base sheet 21. The plurality of leading lines 29a are densely disposed in a wiring region 30 formed at the side edge 21h.

The leading lines 29b are substantially bent at right angles with respect to the Y detection electrodes 5y, 6y, 7y, and 8y and extend in parallel with a side edge 21i of the X2 side of the base sheet 21. The leading lines 29b are densely disposed in a wiring region 31 formed at the side edge 21i. However, the leading lines 29a and 29b do not need to be densely disposed in the wiring regions 30 and 31, respectively. For example, the leading lines 29a and 29b may be sparsely disposed to be spaced at gaps from one another in the wiring regions 30 and 31, respectively.

As shown in FIG. 4, the leading lines 27 and the leading lines 28 are substantially bent at right angles with respect to the X detection electrodes 1x, 2x, 3x, 4x, 5x, and 6x and extend in parallel with a front edge 21f of the Y2 side of the base sheet 21. The plurality of leading lines 27 are densely disposed in a wiring region 32 formed at the front edge 21f. However, the plurality of leading lines 27 do not need to be densely disposed in the wiring region 32. For example, the plurality of leading lines 27 may be sparsely disposed to be spaced at gaps from one another in the wiring region 32.

In the coordinate detection device 20, as shown in FIG. 2, the wiring region 30, in which the leading lines 29a are formed, is deformed downward (the Z2 direction shown in FIG. 2) so as to be distant from the conductor 40. In the embodiment shown in FIG. 2, the wiring region 30, in which the leading lines 29a are formed, is bent downward at a bending angle of 90 degrees through a bending line 30a shown in FIG. 5.

The wiring region 31, in which the leading lines 29b are formed, is deformed downward (the Z2 direction shown in FIG. 2) so as to be distant from the conductor 40. In the embodiment shown in FIG. 2, the wiring region 31, in which the leading lines 29b are formed, is bent downward at a bending angle of 90 degrees through a bending line 31a shown in FIG. 5.

As shown in FIG. 3, the wiring region 32, in which the leading lines 27 are formed, is deformed downward (the Z2 direction shown in FIG. 3) so as to be distant from the conductor 40. In the embodiment shown in FIG. 3, the wiring region 32, in which the leading lines 27 are formed, is bent downward at a bending angle of 90 degrees through a bending line 32a shown in FIG. 4.

In this embodiment, a region surrounded by the bending lines 30a, 31a, and 32a is a planar operation region 34. The operation region 34 is opposite in parallel to the operation surface of the cellular phone 10 having the top surface 11A2 of the upper case 11A and the key tops 12a which are surfaces of the operation keys 12. The bending lines 30a, 31a, and 32a are set at boundary portions between the wiring regions 30, 31, and 32 and the operation region 34.

In the embodiment shown in FIGS. 4 and 5, as shown in FIG. 4, the bending line 30a is formed to pass through boundary portions between the ends of the Y detection electrodes 1y, 2y, 3y, and 4y at the side edge 21h of the base sheet 21 and the leading lines 29a from the front edge 21f of the base sheet 21 toward a back edge 21g. Further, the bending line 31a is formed to pass through boundary portions between the ends of the Y detection electrodes 5y, 6y, 7y, and 8y at the side edge 21i of the base sheet 21 and the leading lines 29b from the front edge 21f of the base sheet 21 toward the back edge 21g. Further, as shown in FIG. 4, the bending line 32a is formed to pass through boundary portions between the ends of the X detection electrodes 1x, 2x, 3x, 4x, 5x, and 6x at the back edge 21f and the leading lines 27 from the side edge 21h of the base sheet 21 toward the side edge 21i.

In the coordinate detection device 20 shown in FIGS. 2 to 5, the wiring regions 30, 31, and 32, in which the leading lines 27, 29a, and 29b are densely disposed, respectively, are bent downward (the Z2 direction shown in FIGS. 2 and 3) from the bending lines 30a, 31a, and 32a to be distant from the conductor 40. As shown in FIGS. 2 and 3, distances L1, L2, and L5 between the conductor 40, which approaches the operation region 34, and the leading lines 27, 29a, and 29b can be increased. As a result, the charges of the plurality of leading lines 27, the plurality of leading lines 29a, or the plurality of leading lines 29b are rarely induced by the conductor, thereby preventing an erroneous coordinate detection operation.

In FIG. 2, the leading lines 29a and 29b, which are not bent downward, are indicated by one-dot-chain lines. Like the related art coordinate detection device, if the coordinate detection device is mounted on the cellular phone 10 while the base sheet 21 is in a planar shape, not bent, a distance L3 between the conductor 40 scanning the operation surface and the leading lines 29a and a distance L4 between the conductor L4 and the leading lines 29b become shorter than the distances L1 and L2 in the coordinate detection device 20, in which the leading lines 29a and 29b are bent downward. Therefore, the charges of the plurality of leading lines 29a or the plurality of leading lines 29b may be induced by the conductor 40.

Figure 6:
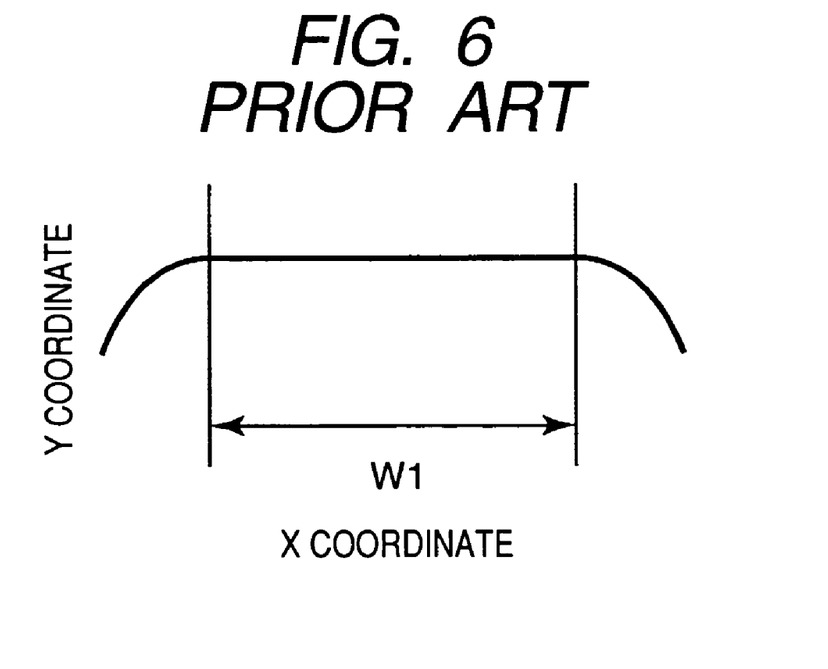
FIG. 6 is a graph that illustrates a detection curve of a coordinate detection device according to the related art.
Figure 7:
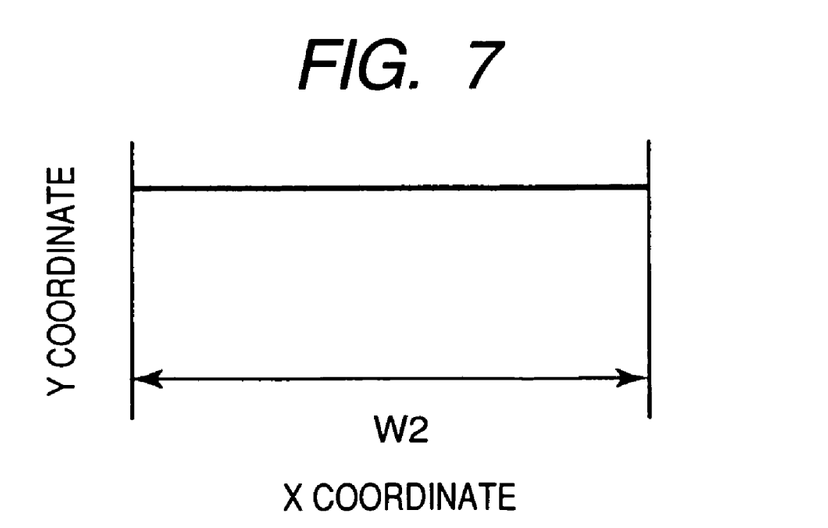
FIG. 7 is a graph showing a detection curve of a coordinate detection device according to an embodiment shown in FIG. 4.

FIG. 6 is a detection curve that shows coordinate detection output results when the conductor 40 is moved on the surface 21e of the base sheet 21 from the X1 direction toward the X2 direction while the position of the conductor 40 in the Y direction is constant in the related art coordinate detection device (having the structure indicated by a one-dot-chain line in FIG. 2), in which the base sheet 21 is not bent. FIG. 7 is a detection curve showing coordinate detection output results when the conductor 40 is moved on the surface 21e of the base sheet 21 from the X1 direction toward the X2 direction while the position of the conductor 40 in the Y direction is constant in the coordinate detection device 20 of the embodiment.

In the graphs shown in FIGS. 6 and 7, a horizontal axis indicates the detection position of the X coordinate of the conductor 40, and a vertical axis indicates the detection position of the Y coordinate. Further, the left direction corresponds to the side edge 21h of the base sheet 21 (the wiring region 30), and the right direction corresponds to the side edge 21i of the base sheet 21 (the wiring region 31).

As shown in FIG. 6, in the related-art coordinate detection device, the X coordinate of the detection curve varies on the right and left sides. In the wiring region 30 and the wiring region 31 that are disposed on the left and right sides, erroneous detection is performed as if the conductor 40 is moved in the Y direction, regardless of the movement of the conductor 40 with the constant Y coordinate.

This is because the distance L3 between the conductor 40 and the wiring region 30 is small, the conductor 40 may be simultaneously brought into contact with multiple leading lines among the leading lines 29a when the conductor 40 is close to the leading lines 29a and 29b, and the Y detection electrodes distant from the conductor 40 may perform erroneous detection due to the variation in the charges of the leading lines 29a.

In the coordinate detection device that has the structure according to the related art, a region where linearity between an actual Y coordinate of the conductor 40 and the detection coordinate position is obtained has a range W1 narrower than the width of the actual operation region 34, as shown in FIG. 6.

In contrast, in the coordinate detection device 20, as shown in FIG. 7, the detection curve is constant over the right side and the left side. On the sides where the leading lines 29a and the leading lines 29b are located, that is, the left and right sides in the drawing, the Y coordinate in the detection coordinates of the conductor 40 is output as a constant value.

Since the wiring regions 30 and 31 where the leading lines 29a and 29b are densely disposed are bent from the bending lines 30a and 31a, respectively, downward to be distant from the conductor 40 (the Z2 direction shown in FIGS. 2 and 3), the distances L1 and L2 between the conductor 40 and the leading lines 29a and 29b can be made large. The conductor 40 does not have an effect on the plurality of leading lines 29a or the plurality of leading lines 29b.

For this reason, in the coordinate detection device 20, a region where linearity between the Y coordinate of the conductor 40 and the detection coordinate position is obtained becomes a range W2 which is equal to the actual operation region 34.

In the embodiment shown in FIG. 1, the coordinate detection device 20 is mounted on the cellular phone 10. However, in recent years, with the reduction in size of the cellular phone 10, the operation unit 11 is reduced in size. Accordingly, the area of the base sheet 21 of the coordinate detection device 20 needs to be reduced. However, in the coordinate detection device having the structure according to the related art, a ratio of the area where linearity is obtained (a region to be detected with high accuracy) is small. Accordingly, if only the region where linearity is obtained is set as the operation region, the operation region where the conductor 40 is brought into contact with or approaches is drastically narrowed.

Meanwhile, if the wiring regions 30 and 31 are formed at positions far away from the operation region, the area of the surface 21e of the base sheet 21 needs to be increased. Accordingly, it is difficult to mount the coordinate detection device on the operation unit 11 with a reduced size.

In contrast, in the coordinate detection device 20, a ratio of the area where linearity is obtained (a region to be detected with high accuracy) is increased. Therefore, even when the area of the base sheet 21 is reduced, the operation region where the conductor 40 is brought into contact with or approaches can be increased.

Therefore, the coordinate detection device 20 can be particularly adapted to be mounted on the latest cellular phone 10 with a reduced size.

Until now, the effects of the coordinate detection device 20 has been described by way of the wiring regions 30 and 31, and the Y detection electrode 3y, but the same description is applied to other Y detection electrodes 1y, 2y, 4y, 5y, 6y, 7y, and 8y.

The positions of the wiring regions 30, 31, and 32 formed in the base sheet 21 are not limited. Further, in the embodiment shown in FIGS. 4 and 5, the leading lines 27 and 28 are formed in the wiring region 32, but the leading lines 27 and 28 may be formed in other wiring regions.

In the embodiment shown in FIGS. 4 and 5, all the three leading lines 27, 29a, and 29b are bent to be distant from the conductor 29. However, if at least one of the three leading lines 27, 29a, and 29b is bent, an area to be detected with high accuracy can be increased.

In the coordinate detection device 20 of the embodiment, the bending angle is not limited, but may be less than 90 degrees or more than 90 degrees. Preferably, the bending angle is set to 90 degrees because the distances L1, L2, and L5 between the conductor 40 and the leading lines 27, 29a, and 29b can be increased.

In the embodiment shown in FIGS. 2 and 3, the wiring regions 30, 31, and 32 having the leading lines 27, 29a, and 29b are bent downward through the bending lines 30a, 31a, and 32a, respectively. However, the invention is not limited to this configuration. For example, the wiring regions 30, 31, and 32 having the leading lines 27, 29a, and 29b may be curved downward.

Although the cellular phone 10 is illustrated as an information terminal apparatus in the above description, the coordinate detection device 20 of the embodiment may be mounted on an information terminal apparatus, such as a personal computer or the like, other than the cellular phone 10.

As described above, in the coordinate detection device 20, the area of the detection region to be detected with high accuracy can be increased, as compared with the related art coordinate detection device. Therefore, mounting efficiency on an information terminal apparatus can be increased. In particular, the coordinate detection device can be properly mounted on the small cellular phone 10.

In the coordinate detection device according to the embodiment of the invention, the substrate is deformed such that the wiring region where the leading lines to be connected to the detection electrodes are located is distant from the surface of the operation side of the substrate. Therefore, a distance between the conductor and the wiring region can be increased, and an influence of the leading lines in the wiring region on the detection operation due to the conductor can be prevented. Further, the planar shape of the coordinate detection device can be made small, and thus the coordinate detection device can be properly mounted on a small apparatus.

The invention claimed is:

1. A coordinate detection device comprising:
   a substrate that is formed of an insulating material, and has a surface of an operation side, on which a conductor comes into contact with or approaches, and a rear surface opposite to the surface;
   a plurality of detection electrodes located on the surface or the rear surface that extend in parallel to one another in one direction; and
   common electrodes that are located on the surface or the rear surface and are disposed at gaps from the detection electrodes,
   wherein capacitance between the detection electrodes and the common electrodes is changed when the conductor comes into contact with or approaches the surface,
   the substrate has a wiring region where leading lines to be connected to the detection electrodes are located, the leading lines and the wiring region are disposed on an edge of the substrate, the substrate in the wiring region is bent downward through a bending line of the substrate, and the leading lines extend in a direction crossing the extension direction of the detection electrodes in the wiring region, and the substrate is deformed such that the leading lines are space away from the conductor coming into contact with the surface.

2. The coordinate detection device according to claim 1, wherein the detection electrodes have X detection electrodes that are provided on one surface of the surface and the rear surface of the substrate, and Y detection electrodes that are provided on the other surface and extend to cross the X detection electrodes, the substrate has a wiring region where the leading lines to be connected to the X detection electrodes are located, and a wiring region where the leading lines to be connected to the Y detection electrodes are located, and the substrate is deformed such that at least one leading lines are distant from the conductor.

3. The coordinate detection device according to claim 1, wherein the substrate is a flexible substrate, wherein the substrate has a planar operation region where the detection electrodes and the common electrodes are located, and the wiring region, and wherein the flexible substrate is bent through the bending line which is set at a boundary portion between the operation region and the wiring region.

4. The coordinate detection device according to claim 3, wherein a bending angle of the wiring region with respect to the operation region is 90 degrees.

* * * * *

UNITED STATES PATENT AND TRADEMARK OFFICE
CERTIFICATE OF CORRECTION

| | | |
|---|---|---|
| PATENT NO. | : 7,920,127 B2 | Page 1 of 1 |
| APPLICATION NO. | : 11/490657 | |
| DATED | : April 5, 2011 | |
| INVENTOR(S) | : Hiroaki Takahashi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this
Ninth Day of August, 2011

David J. Kappos
*Director of the United States Patent and Trademark Office*